United States Patent [19]
Yamaguchi et al.

[11] Patent Number: 6,021,161
[45] Date of Patent: Feb. 1, 2000

[54] ADAPTIVE EQUALIZER FOR CONTROLLING A STEP SIZE IN PROPORTION TO AN ESTIMATED DELAY OF RECEIVED SIGNALS

[75] Inventors: Norio Yamaguchi; Haruhiro Shiino, both of Tokyo, Japan

[73] Assignee: Oki Electric Industry Co., Ltd., Tokyo, Japan

[21] Appl. No.: 08/840,638

[22] Filed: Apr. 25, 1997

[30] Foreign Application Priority Data

Apr. 26, 1996 [JP] Japan ................................ 8-106964

[51] Int. Cl.$^7$ ................................ H04L 27/01
[52] U.S. Cl. ................................ 375/232
[58] Field of Search .................. 375/230, 232, 375/231, 233

[56] References Cited

U.S. PATENT DOCUMENTS

| | | | |
|---|---|---|---|
| 5,068,873 | 11/1991 | Murakami | 375/230 |
| 5,224,127 | 6/1993 | Okanoue | 375/343 |
| 5,323,422 | 6/1994 | Ushirokawa | 375/232 |
| 5,359,628 | 10/1994 | Muto | 375/230 |
| 5,751,768 | 5/1998 | Guglieimi et al. | 375/234 |

OTHER PUBLICATIONS

J.G. Proakis et al., "Communication Systems Engineering" Prentice Hall, 1994, pp. 577–595.

*Primary Examiner*—Don N. Vo
*Attorney, Agent, or Firm*—Venable; Robert J. Frank; Michael A. Sartori

[57] ABSTRACT

An adaptive equalizer increases the estimation accuracy of a channel, and prevents the modulation characteristics from degrading. A sampling circuit generates a sampled sequence from a received signal. The sampled sequence is supplied from a buffer to an equalizing circuit, a channel estimating circuit and a delay amount estimating circuit. The equalizing circuit obtains an estimated transmitted symbol sequence from the sampled sequence and an estimated impulse response sequence. The channel estimating circuit obtains the estimated impulse response sequence from the sampled sequence, estimated transmitted symbol sequence and the estimated error. The delay amount estimating circuit supplies an estimated delay amount to a step-size control circuit. An error extracting circuit obtains the estimated error. The step-size control circuit controls a step-size parameter in response to the delay amount, and a tap coefficient update circuit updates the tap coefficients by the estimated transmitted symbol, estimated error $e_n$ and step-size parameter.

10 Claims, 7 Drawing Sheets

ADAPTIVE EQUALIZER FOR CONTROLLING A STEP SIZE IN PROPORTION TO AN ESTIMATED DELAY OF RECEIVED SIGNALS

BACKGROUND OF THE INVENTION

1. Field of the Invention

The present invention relates to an adaptive equalizer used for compensating the transmission delay of a received signal in a receiver of a digital communication system.

2. Description of the Background Art

Recently, digital mobile telecommunications have been intensively developed. One of the problems with the land mobile communications is gross distortion of waveforms of a received signal resulting from frequency selective fading due to fast movement of a mobile station and multiple interference waves accompanying delay. The adaptive equalizer is used for channels whose characteristics change with time to compensate for such distortion.

A conventional equalizer is described, for example, in "Communication Systems Engineering" by J. G. Proakis et al., Prentice Hall, 1994, pp. 577–595, which is incorporated here by reference.

The adaptive equalizers track time variations in the channel response and adapt their coefficients to reduce the distortion. One of such conventional adaptive equalizers is based on an LMS (Least Mean Square) algorithm to estimate the channel characteristics. A received signal y(t) is sampled at a symbol period T to output a sampled sequence $\{y_n\}$. The algorithm for optimizing the tap coefficients $\{Eht(0), Eht(1), \ldots, Eh(M)\}$ based on the LMS is expressed as $$Eht(i)^{n+1} = Eht(i)^n + \beta^* e_n^* Ex(n-i), \quad (1)$$

where $Eht(i)^{n+1}$ denotes tap coefficients at the (n+1)-th time instant, $Eht(i)^n$ denotes tap coefficients at the n-th time instant, $\beta$ denotes a step-size parameter which is a fixed value, Ex(n) denotes an estimated transmitted symbol sequence, and $e_n$ denotes the difference obtained from the estimated transmitted symbol sequence Ex(n) and the sampled sequence $\{y_n\}$ where E placed at the initial position of the data names represents that they are an estimate.

Another adaptive equalizer is based on the MLSE (Maximum Likelihood Sequence Estimation). It estimates, when a finite received sampled sequence $Y_k = \{y_1, y_2, \ldots, y_n\}$ is obtained, a transmitted symbol sequence $x_k = \{x_1, x_2, \ldots, x_n\}$ that provides the maximum likelihood of the finite received sampled sequence $Y_k = \{y_1, y_2, \ldots, y_n\}$ under the condition that the impulse response h(t) of the channel is known. This corresponds to obtaining the symbol sequence that maximizes the following expression (2), assuming that the channel noise is the white Gaussian noise.

$$-\sum_{k=1}^{N} \left| y_k - \sum_j x_j h(t - jT) \right|^2 \quad (2)$$

Expression (2) can be calculated using the Viterbi algorithm.

The conventional adaptive equalizers, however, have the following problems. If there is no delayed wave on the channel, it would be ideal if the values of the delay term taps of the finite tap model would become zero. In practice, however, they have some non-zero amounts because of the estimated error $e_n$. This decreases the estimation accuracy, which results in the degradation in the demodulation characteristics of a receiver.

The estimation accuracy can be improved by reducing the tracking speed of the delay term taps of the finite tap model of the channel, or by updating the tap coefficients after leaking, that is, after reducing the weighting factors of the past tap coefficients when updating the delay term taps. However, if there is a delayed wave on the channel, the reduction of the tracking speed or the leakage of the tap coefficients presents a problem because the delay term taps themselves must also follow the time variations in the channel. There is another problem in that the demodulation characteristics of the receiver degrade owing to a temporary reduction in the power level of the received signal due to fading or the like.

SUMMARY OF THE INVENTION

It is therefore an object of the present invention to provide an adaptive equalizer capable of achieving good demodulation characteristics regardless of the presence or absence of a delayed wave on the channel by improving the estimation accuracy of the channel.

According to a first aspect of the present invention, there is provided an adaptive equalizer for compensating time-varying characteristics of a channel by estimating impulse response of the channel and by controlling tap coefficients of the adaptive equalizer in response to the estimated impulse response, the adaptive equalizer comprising: a sample-and-hold circuit for sampling a received signal fed through the channel, and for temporarily holding a sampled sequence generated by sampling; an equalizer circuit for estimating transmitted symbols in response to the sampled sequence and the estimated impulse response of the channel to generate an estimated transmitted symbol sequence; an error extracting circuit for extracting an estimated error sequence from the sampled sequence and the estimated transmitted symbol sequence; a tap coefficient update circuit for sequentially performing update calculations of the tap coefficients from the estimated error sequence and a step-size parameter by using a least mean square algorithm to sequentially generate the estimated impulse response of the channel; a detector circuit for obtaining from the sampled sequence one of an estimated delay amount of the received signal and an average amplitude of the received signal; and a control circuit for controlling one of the step-size parameter and leakage amounts of past tap coefficients in response to a detected value by the detector circuit when updating the tap coefficients.

Here, the detector circuit may obtain the estimated delay amount of the received signal, and the control circuit may make the step-size parameter proportional to the estimated delay amount of the received signal.

The detector circuit may obtain the estimated delay amount of the received signal, and the control circuit may make the leakage amounts of the past tap coefficients proportional to the estimated delay amount of the received signal.

The detector circuit may obtain the average amplitude of the received signal, and the control circuit may make the step-size parameter proportional to the average value of the received signal.

The detector circuit may obtain the average amplitude of the received signal, and the control circuit may make the leakage amounts of the past tap coefficients proportional to the average value of the received signal.

According to a second aspect of the present invention, there is provided an adaptive equalizer for compensating time-varying characteristics of a channel by estimating impulse response of the channel and by controlling tap coefficients of the adaptive equalizer in response to the estimated impulse response, the adaptive equalizer comprising: a sample-and-hold circuit for sampling a received signal fed through the channel, and for temporarily holding a sampled sequence generated by sampling; an equalizer circuit for estimating transmitted symbols in response to the sampled sequence and the estimated impulse response of the channel to generate an estimated transmitted symbol sequence; a channel estimating circuit for estimating the impulse response of the channel in response to the sampled sequence and the estimated transmitted symbol sequence; and a delay amount estimating portion for estimating an estimated delay amount of the received signal from the sampled sequence, wherein the equalizer circuit carries out, when the delay amount of the received signal is smaller than a predetermined threshold, equalization processing by using values in which delayed wave term is reset of the estimated impulse response of the channel estimated by the channel estimating circuit.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Embodiment 1

Before describing embodiments of an adaptive equalizer in accordance with the present invention, a transmitter and receiver will be described to which the adaptive equalizer is applied.

Figure 2:
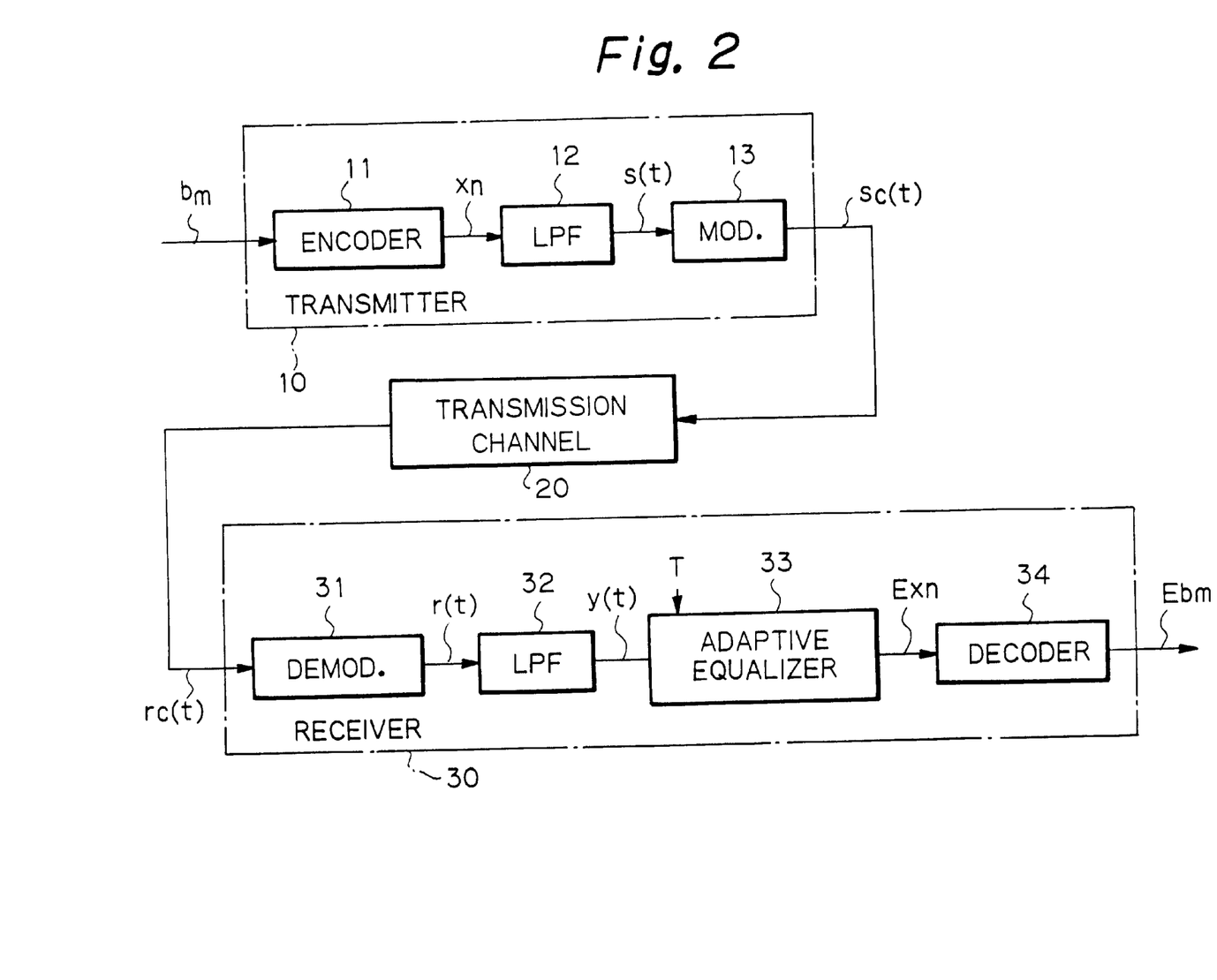
FIG. 2 is a schematic block diagram showing a transmitter and receiver for digital mobile communications to which the adaptive equalizer in accordance with the present invention is applied.

FIG. 2 shows in a schematic block diagram a transmitter and a receiver for digital mobile communications to which the adaptive equalizer in accordance with the present invention is applied. In FIG. 2, a transmitter 10 is connected to a receiver 30 through a channel 20. The transmitter comprises an encoder 11, a transmitting lowpass filter (LPF) 12 and a modulator 13. The receiver 30 comprises a demodulator 31, a receiving lowpass filter (LPF) 32, an adaptive equalizer 33, and a decoder 34.

In operation, in the transmitter 10, the encoder 11 encodes the input data $b_m$ into transmitted symbols $x_n$, which include I and Q components that are in quadrature to each other. The transmitter LPF 12 bandlimits the transmitted symbols $x_n$ to develop a complex baseband transmitted signal s(t) at its outpout port. The modulator 13 modulates a carrier with the complex baseband transmitted signal s(t), and transmits it over the channel 20 in the form of the transmitted signal $s_c(t)$.

In the receiver 30, the demodulator 31 demodulates a signal $r_c(t)$ received through the channel 20 into a complex baseband signal r(t). The receiving LPF 32 bandlimits the complex baseband signal r(t) to output a complex baseband received signal y(t). The adaptive equalizer 33 samples the signal y(t) at every symbol period T, and compensates for variations in the characteristics of the channel 20 due to frequency selective fading in response to the sampled sequence, thereby outputting estimated transmitted symbols $Ex_n$. Finally, the decoder 34 decodes the estimated transmitted symbols $Ex_n$ to obtain the transmitted data $Eb_m$, where E placed at the beginning of the data names indicates that they are estimated one.

Figure 1:
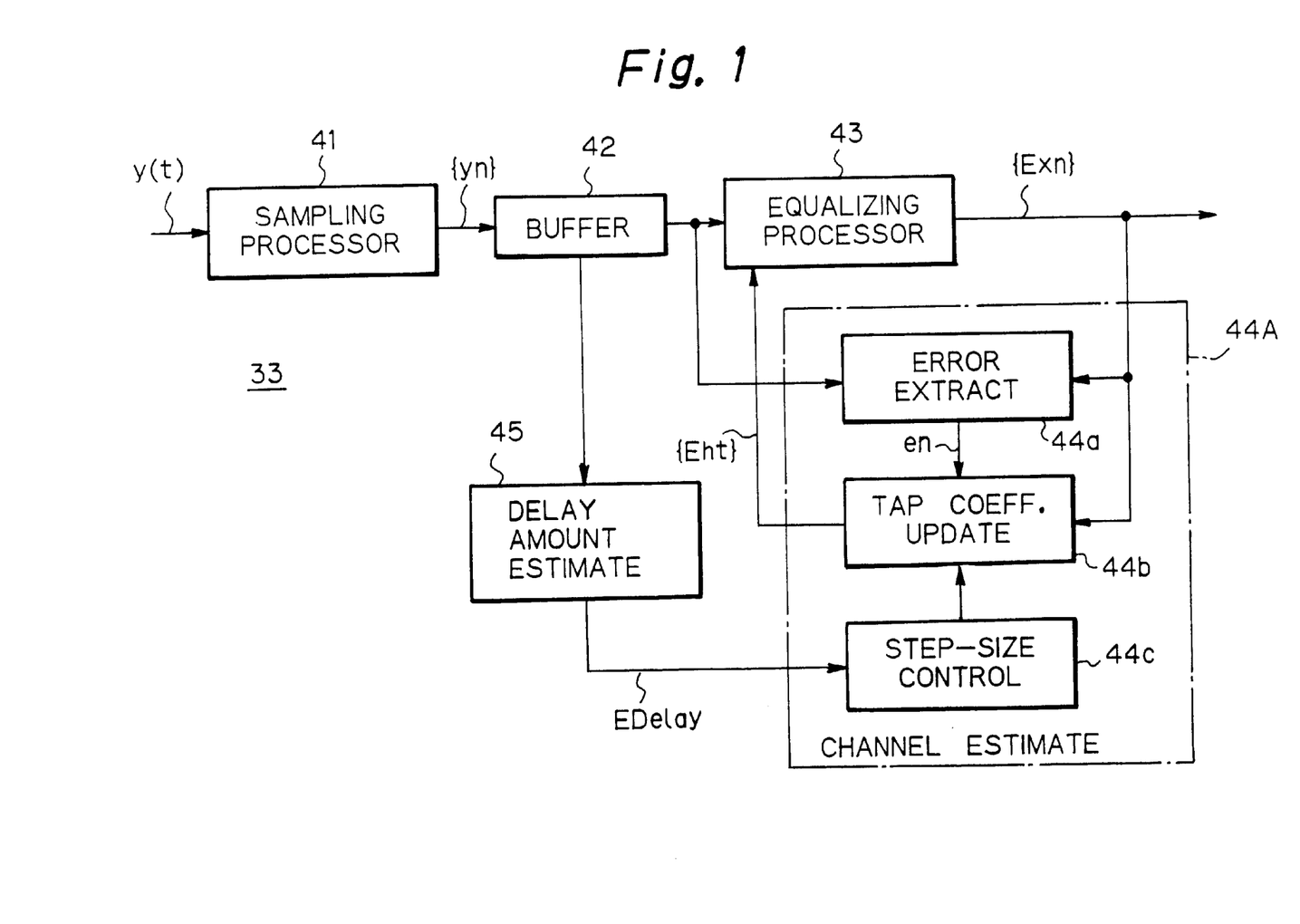
FIG. 1 is a schematic block diagram showing a first embodiment of an adaptive equalizer in accordance with the present invention.

The invention will now be described specifically with reference to the accompanying drawings. FIG. 1 is a block diagram showing the embodiment 1 of an adaptive equalizer in accordance with the present invention, which is employed in the receiver 30 as the adaptive equalizer 33. The adaptive equalizer is constructed with a DSP (Digital Signal Processor) controlled by program sequences in the illustrative embodiment. It includes a sampling processor or circuit 41 for sampling a received signal y(t) fed from the receiving LPF 32, FIG. 2, at every symbol period T to generate a sampled sequence $\{y_n\}$. The sampled sequence $\{y_n\}$ output from the sampling processor 41 is supplied to a buffer 42 to be stored. The sampling processor 41 and buffer 42 constitute a sample-and-hold circuit. The output of the buffer 42 is delivered to the input of an equalizing processor or circuit 43 and a first input of an error extracting section 44a in a channel estimating unit 44A. The equalizing processor 43 is adapted to carry out equalization based on the sampled sequence $\{y_n\}$ and an estimated impulse response sequence $\{Eht\}$ of the channel 20, thereby generating estimated transmitted symbol sequence $\{Ex_n\}$. The output of the equalizing processor 43 is supplied to a second input of the error extracting section or circuit 44a and a first input of a tap coefficient update section 44b in the channel estimating unit 44A. The error extracting section or circuit 44a extracts an estimated error sequence $e_n$ from the sampled sequence $\{y_n\}$ and the estimated transmitted symbol sequence $\{Ex_n\}$.

The output of the buffer 42 is further supplied to the input of a delay amount estimating section or circuit 45 which estimates a delay amount EDelay taking place on the channel 20. The delay amount estimation is carried out by finding peak positions of the output of a correlator for recovering a clock signal at every predetermined observation period (frame period, for example), and by observing the fluctuation of the peak positions. The output of the delay amount estimating section 45 is supplied to the input of a step-size control section 44c in the channel estimating unit 44A. The step-size control section or circuit 44c controls a step-size parameter in response to the delay amount EDelay. The output of the step-size control section 44c is supplied to a second input of the tap coefficient update section or circuit 44b which updates the tap coefficients of a finite tap model of the channel by applying an LMS (Least Mean Square) algorithm to the estimated error $e_n$ and the step-size parameter.

Figure 3:
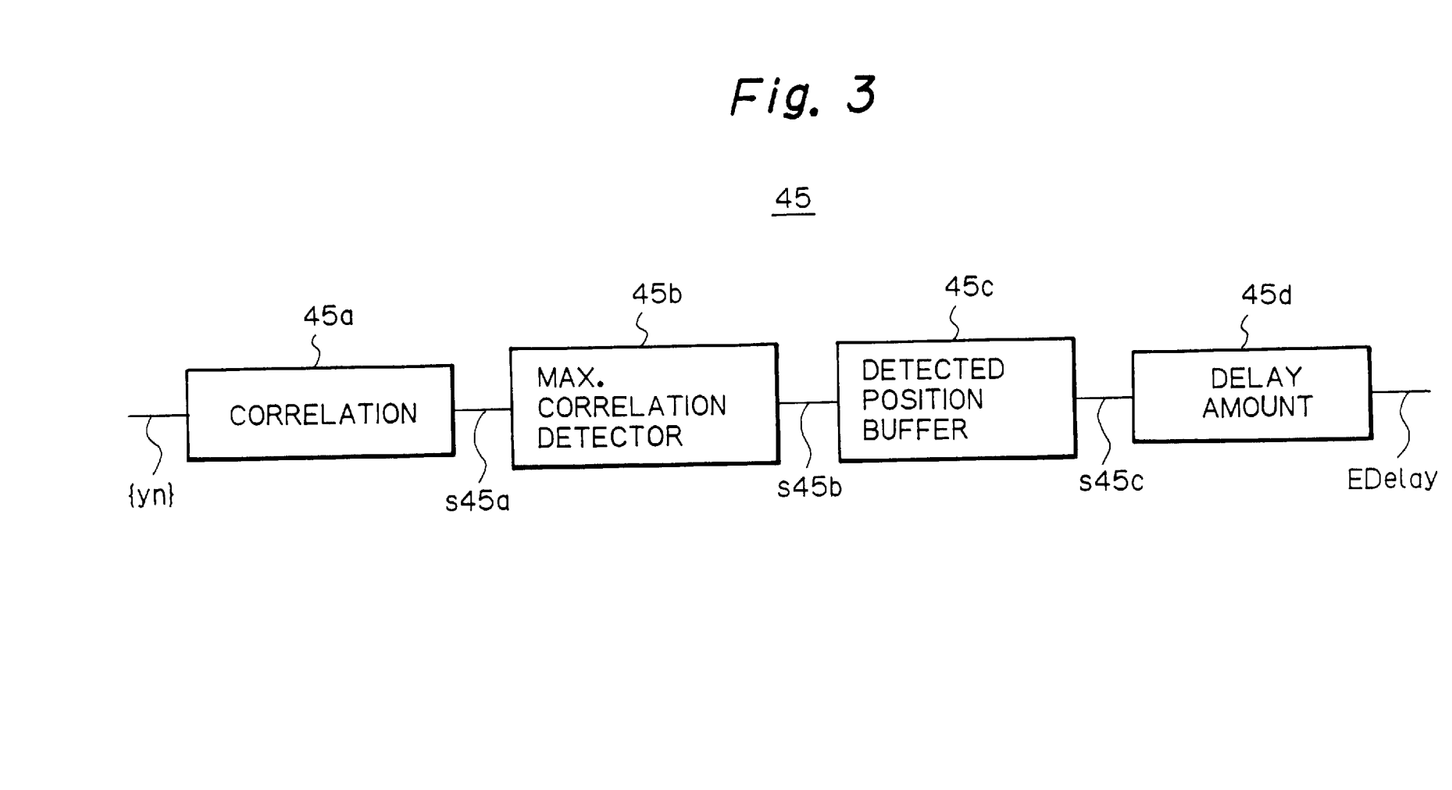
FIG. 3 is a schematic block diagram showing a delay amount estimating section of FIG. 1.

FIG. 3 is a block diagram showing an example of a delay amount estimating section 45 in FIG. 1. The delay amount estimating section or circuit 45 comprises a correlation calculator 45a, a maximum correlation detector 45b, a detected position buffer 45c and a delay amount calculator 45d. The correlation calculator 45a obtains correlations S45a between a reference sequence (synchronized sequence) for clock recovery and a sub-sequence of the sampled sequence $\{y_n\}$ of the received signal at every observation period. The maximum correlation detector 45b searches for maximum correlation values S45b of the correlations S45a at every observation period. The detected position buffer 45c holds detected positions S45c of the correlation values S45b beginning from a predetermined period before up to the present time, which has been set for observing the fluctuation. The delay amount calculator 45d obtains the delay amount EDelay from the range of the fluctuations of the detected positions S45c held in the detected position buffer 45c.

In operation, with reference to FIG. 1, the sampling processor 41 samples the received signal y(t) to generate the sampled sequence $\{y_n\}$, and outputs it to the buffer 42. The sampled sequence $\{y_n\}$ input to the buffer 42 is temporarily stored there, and is supplied to the equalizing processor 43, channel estimating section 44A and delay amount estimating section 45.

The equalizing processor 43 carries out equalization based on the sampled sequence $\{y_n\}$ and the estimated impulse response sequence {Eht} of the channel 20 estimated by the channel estimating section 44A.

The channel estimating section 44A obtains the estimated impulse response sequence {Eht} of the channel 20 from the sampled sequence $\{y_n\}$, estimated transmitted symbol sequence $\{Ex_n\}$ and estimated error $e_n$.

The delay amount estimating section 45, receiving the sampled sequence $\{y_n\}$ from the buffer 42, estimates the estimated delay amount EDelay over the channel 20, and outputs it to the step-size control section 44c in the channel estimating section 44A.

In the channel estimating section 44A, the error extracting section 44a extracts the estimated error $e_n$ from the estimated transmitted symbol sequence $\{Ex_n\}$ and the sampled sequence $\{y_n\}$, and the step-size control section 44c controls the step-size parameter $\beta(i)$ (i=0, 1, . . . , M) as follows in response to the estimated delay amount EDelay estimated by the delay amount estimating section 45.

$$\beta(0)=\beta 0$$

$$\beta(i)=\beta 0*\text{EDelay}/(i*T),$$

when EDelay/(i*T)$\leq$1, $$\beta(i)=\beta 0$$

otherwise,
where
  $\beta 0$: reference value of the step-size parameter, and
  T: tap interval.

The tap coefficient update section 44b updates the tap coefficients {Eht(0), Eht(1), . . . , Eht(M)} in accordance with the following equation (3) in response to the estimated transmitted symbol sequence Ex(n), estimated error $e_n$ and the step-size parameter $\beta(i)$ set by the step-size control section 44c.

$$Eht(i)^{n+1}=Eht(i)^n+\beta(i)*e_n*Ex(n-i) \quad (3)$$

As shown in equation (3), the speed and accuracy of tracking of the delay term taps of the finite tap model of the channel 20 is controlled in response to the delay state of the channel 20.

According to the first embodiment, since the adaptive equalizer is provided with the delay amount estimating section 45 for estimating the estimated delay amount EDelay of the received signal y(t), and the step-size control section 44c for making the step-size parameter proportional to the estimated delay amount EDelay when updating the tap coefficients, the tracking speed and accuracy of the delay term taps of the finite tap model of the channel 20 can be controlled in response to the delay state of the channel 20. This makes it possible to achieve good demodulation characteristics of the receiver regardless of the delay over the channel 20.

Embodiment 2

Figure 4:
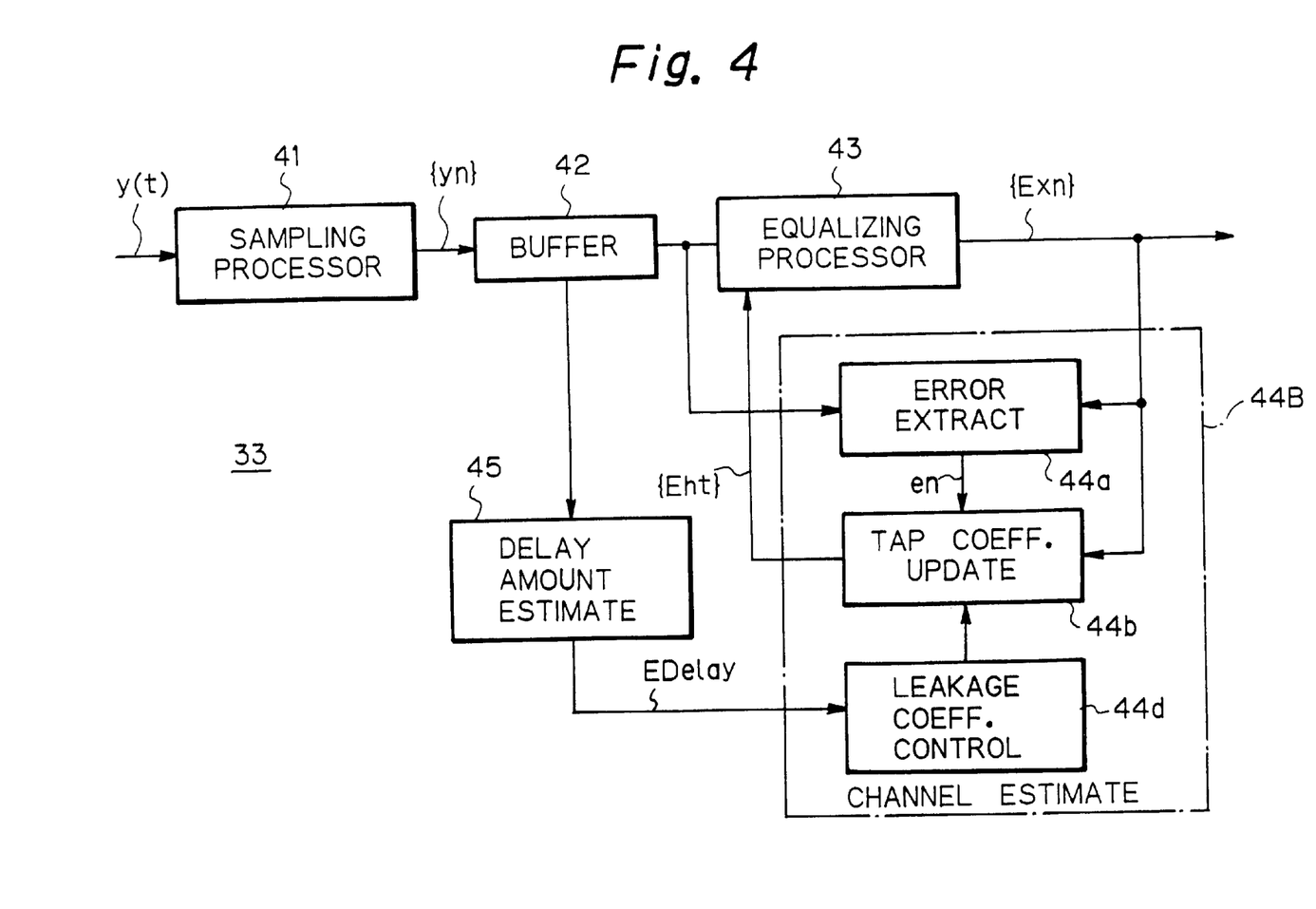
FIG. 4 is, similar to FIG. 1, a schematic block diagram showing a second embodiment of the adaptive equalizer in accordance with the present invention.

FIG. 4 is a block diagram showing a second embodiment of the adaptive equalizer in accordance with the present invention, in which the like elements are designated by the same reference numerals. The second embodiment is the same as the first embodiment except that its channel estimating unit 44B has a configuration different from that of the channel estimating unit 44A. The channel estimating unit 44B includes a leakage coefficient control section or circuit 44d instead of the step-size control section 44c in the channel estimating unit 44A. The leakage coefficient control section 44d controls leakage coefficients in response to the estimated delay amount EDelay estimated by the delay amount estimating section 45, where the leakage coefficients are coefficients for reducing the weight of the past tap coefficients. The remaining configuration is the same as that of FIG. 1.

The operation of the adaptive equalizer of FIG. 4 differs from that of FIG. 1 in the following. Specifically, the leakage coefficient control section 44d controls the leakage coefficients L(i) (i=0, 1, . . . , M) as follows in response to the estimated delay amount EDelay estimated by the delay amount estimating section 45.

$$L(0)=1$$

$$L(i)=\text{EDelay}/(i*T),$$

when EDelay/(i*T)$\leq$1, $$L(i)=1$$

otherwise,
where T is a tap interval.

The tap coefficient update section 44b updates the tap coefficients {Eht(0), Eht(1), . . . , Eht(M)} in accordance with the following equation (4) in response to the estimated transmitted symbols Ex(n), estimated error $e_n$ and the leakage coefficients L(i) set by the leakage coefficient control section 44d.

$$Eht(i)^{n+1}=Eht(i)^n*L(i)+\beta*e_n*Ex(n-i) \quad (4)$$

where is a step-size parameter.

As shown in equation (4), the speed and accuracy of tracking of the delay term taps of the finite tap model of the channel 20 is controlled in response to the delay state of the channel 20.

According to the second embodiment, the adaptive equalizer is provided with the delay amount estimating section 45 for estimating the estimated delay amount EDelay of the received signal y(t), and the leakage coefficient control section 44d for making the leakage amounts of the past tap coefficients proportional to the estimated delay amount EDelay when updating the tap coefficients. The tracking speed and accuracy of the delay term taps of the finite tap model of the channel 20 can thus be controlled in response to the delay state of the channel 20 as in the first embodiment. This makes it possible to implement good demodulation characteristics of the receiver regardless of the delay over the channel 20.

Embodiment 3

Figure 5:
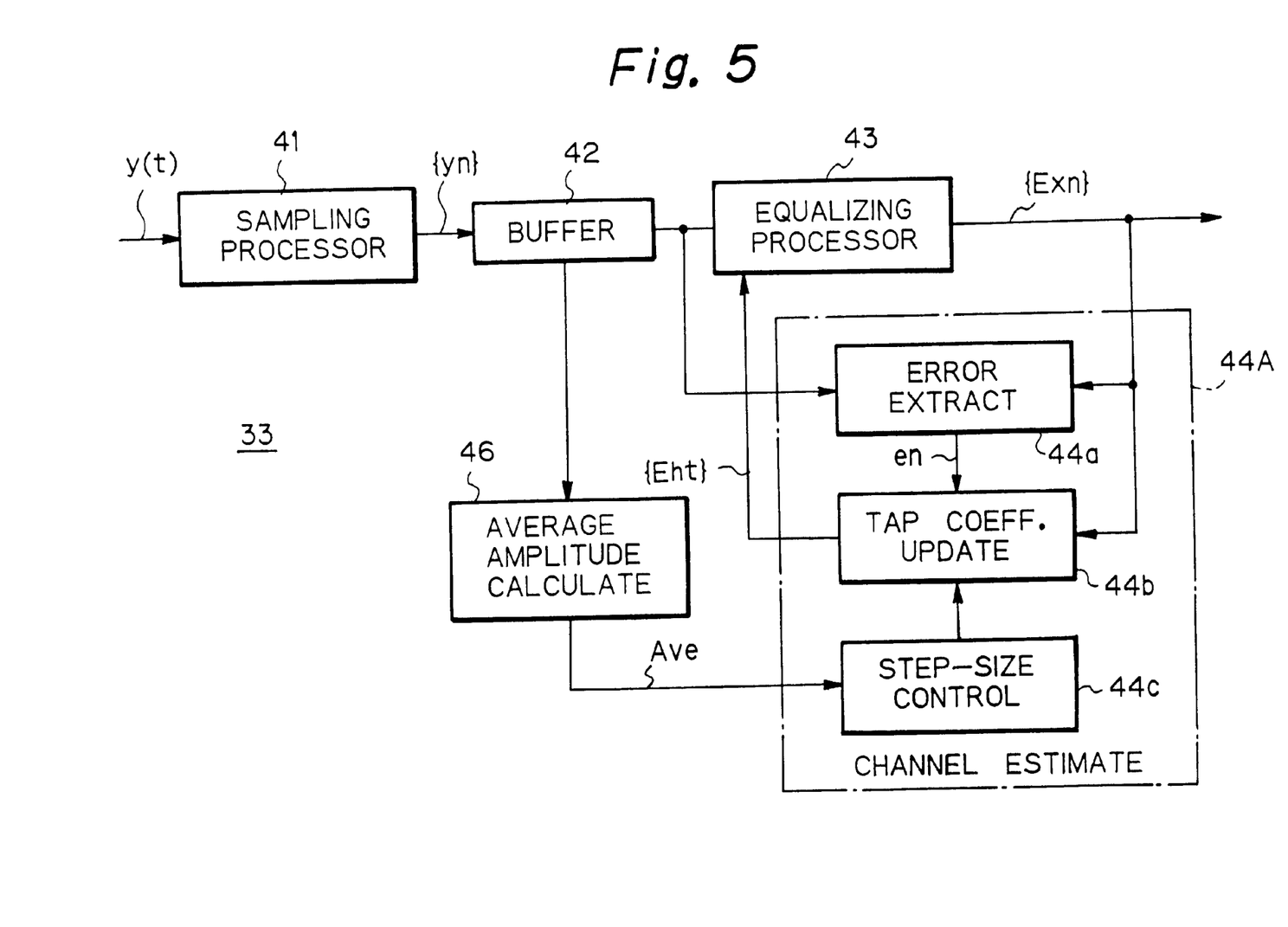
FIG. 5 is also a schematic block diagram showing a third embodiment of the adaptive equalizer in accordance with the present invention.

FIG. 5 is a block diagram showing a third embodiment of the adaptive equalizer in accordance with the present invention, in which the like elements are designated by the same reference numerals as in FIG. 1. The third embodiment is the same as the first embodiment except that the delay amount estimating section 45 in FIG. 1 is replaced by an average amplitude calculating section 46 for calculating an average amplitude Ave of the received signal y(t). The remaining configuration is the same as that of FIG. 1.

More specifically, the sampled sequence $\{y_n\}$ stored in the buffer 42 is delivered to the equalizing processor 43, channel estimating unit 44A and average amplitude calculating section 46.

The average amplitude calculating section 46, receiving the sampled sequence $\{y_n\}$ from the buffer 42, obtains the average amplitude Ave of the received signal y(t), and outputs it to the channel estimating unit 44A.

In the channel estimating section 44A, the step-size control section 44c controls the step-size parameter β as follows in response to the average amplitude Ave fed from the average amplitude calculating section 46.

$$\beta = \beta 0 * Ave,$$

when Ave ≤ 1.0, $$\beta = \beta 0,$$

otherwise, where β0 is a reference value of the step-size parameter.

The tap coefficient update section 44b updates the tap coefficients {Eht(0), Eht(1), ... , Eht(M)} in accordance with the following equation (5) in response to the estimated transmitted symbols Ex(n), the estimated error $e_n$ obtained by the error extracting section 44a, and the step-size parameter β set by the channel estimating unit 44C.

$$Eht(i)^{n+1} = Eht(i)^n + \beta * e_n * Ex(n-i) \qquad (5)$$

As shown in equation (5), the tracking speed of the channel estimating unit 44A is controlled in response to the power level of the received signal.

According to the third embodiment, the adaptive equalizer is provided with the average amplitude calculator section 46 for calculating the average amplitude Ave of the received signal y(t), and the step-size control section 44c for making the step-size parameter β proportional to the average amplitude Ave, when updating the tap coefficients. The tracking speed of the channel estimating section 44A can thus be controlled in response to the power level of the received signal y(t). This makes it possible to solve the conventional problem in that the error possibility of the estimation of the channel increases and the demodulation characteristics of the receiver degrade when the power level of the received signal y(t) falls temporarily due to fading or the like.

Embodiment 4

Figure 6:
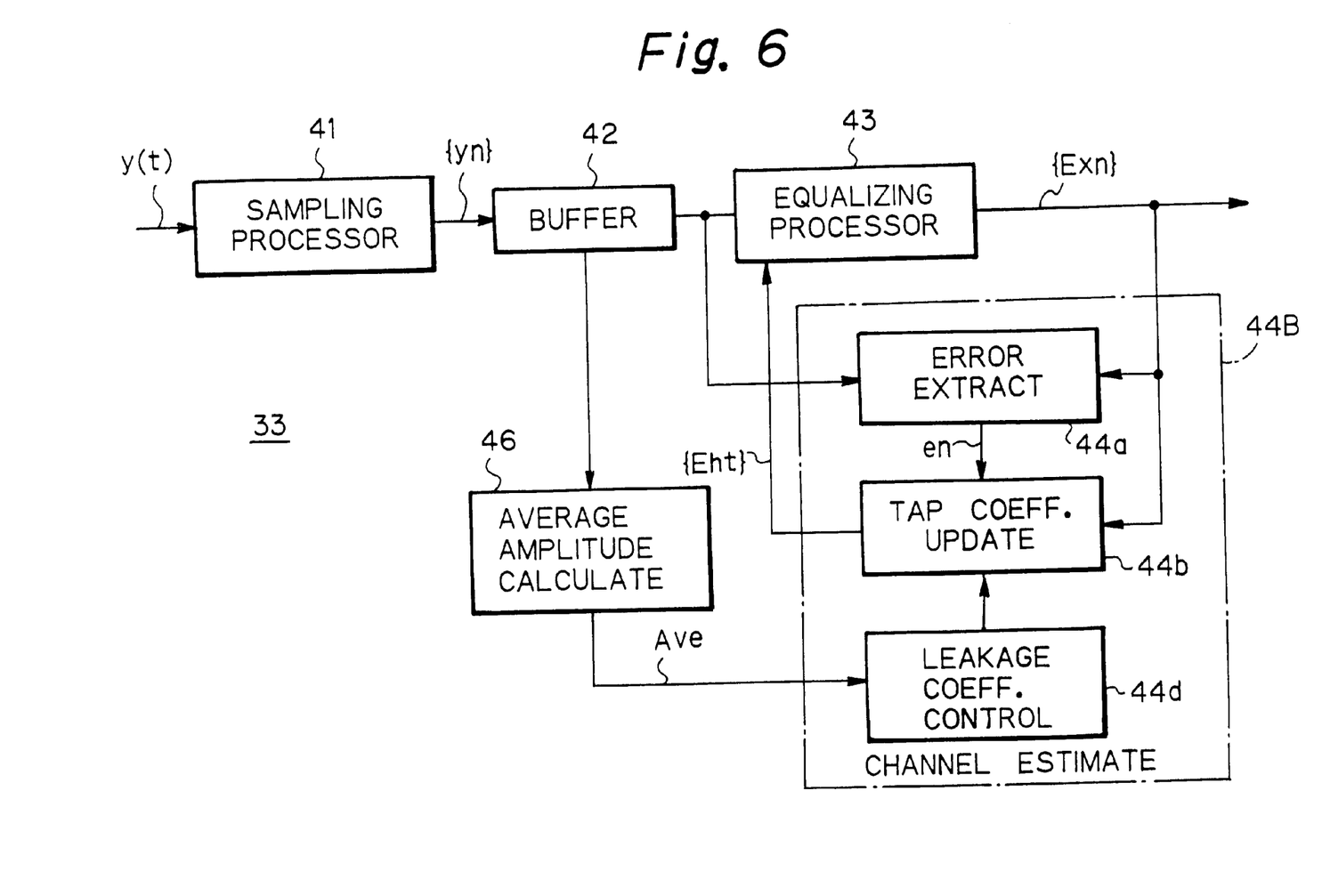
FIG. 6 is a schematic block diagram showing a fourth embodiment of the adaptive equalizer in accordance with the present invention.

FIG. 6 is a block diagram showing a fourth embodiment of the adaptive equalizer in accordance with the present invention, in which also the like elements are designated by the same reference numerals as in FIGS. 4 and 5. The fourth embodiment is the same as the second embodiment as shown in FIG. 4 except that the delay amount estimating section 45 in FIG. 4 is replaced by the average amplitude calculating section 46 as shown in FIG. 5. The remaining configuration is the same as that of FIG. 4.

More specifically, the leakage coefficient control section or circuit 44d controls the leakage coefficients L(i) as follows in response to the average amplitude Ave obtained by the average amplitude calculating section 46.

$$L(0)=1$$

$$L(i)=Ave,$$

when Ave ≤ 1, $$L(i)=1,$$

otherwise.

The tap coefficient update section 44b updates the tap coefficients {Eht(0), Eht(1), ... , Eht(M)} as shown by the foregoing equation (4) in response to the estimated transmitted symbols Ex(n) output from the equalizing processor 43, the estimated error $e_n$ obtained by the error extracting section 44a, and the leakage coefficients L(i) set by the leakage coefficient control section 44d.

As shown in equation (4), the tracking accuracy of the channel estimating unit 44B is controlled in response to the power level of the received signal y(t).

According to the fourth embodiment, the adaptive equalizer is provided with the average amplitude calculating section 46 for calculating the average amplitude Ave of the received signal y(t), and the leakage coefficient control section 44d for making the leakage amount of the past tap coefficients proportional to the estimated delay amount EDelay when updating the tap coefficients. The tracking accuracy of the channel estimating section 44B can thus be controlled in response to the power level of the received signal y(t). This makes it possible to solve the conventional problem in that the error possibility of the estimation of the channel increases and the demodulation characteristics of the receiver degrade when the power level of the received signal y(t) falls temporarily due to fading or the like.

Embodiment 5

Figure 7:
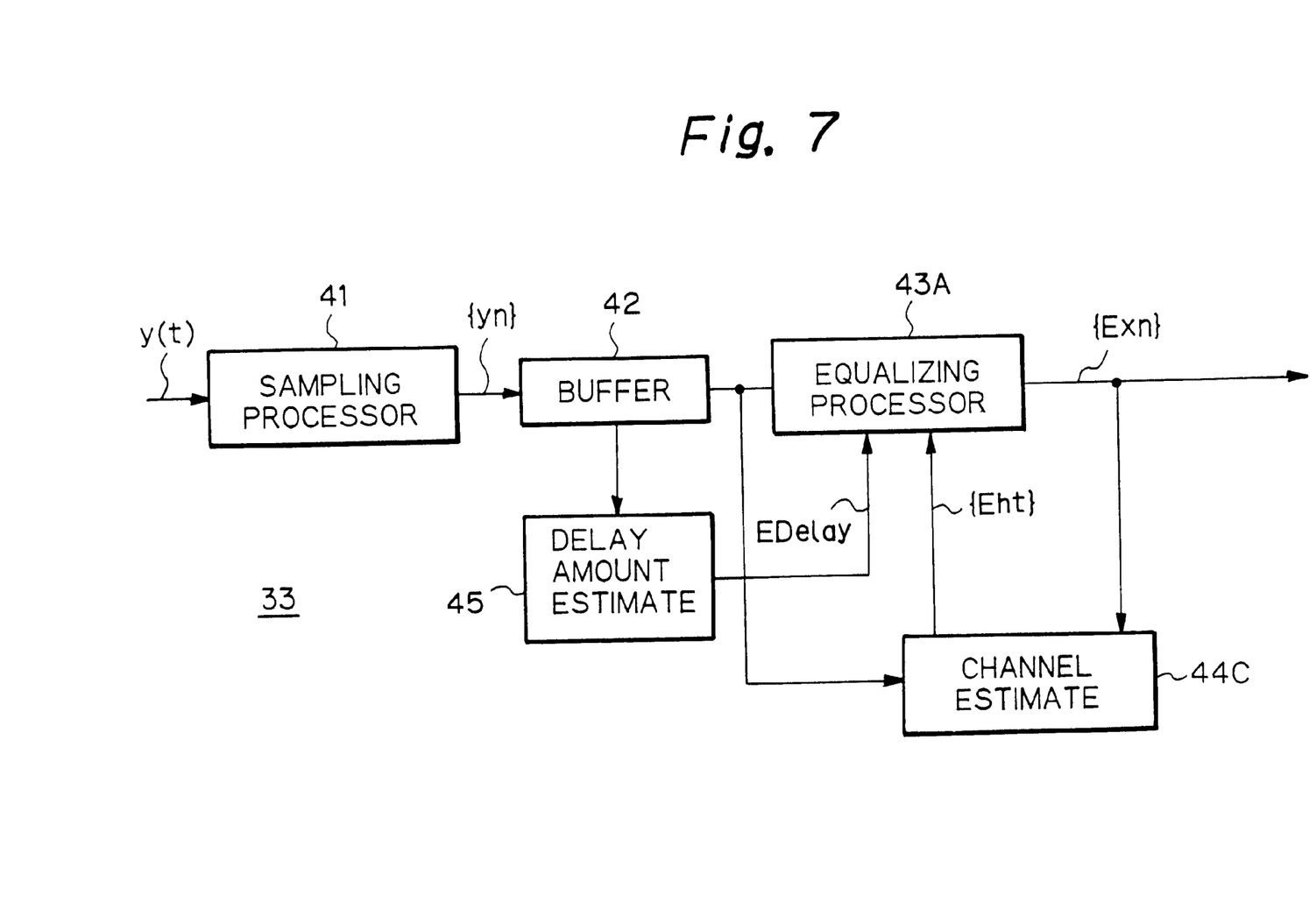
FIG. 7 is a schematic block diagram showing a fifth embodiment of the adaptive equalizer in accordance with the present invention.

FIG. 7 is a schematic block diagram showing a fifth embodiment of the adaptive equalizer in accordance with the present invention, in which the like elements are designated by the same reference numerals as in FIG. 1. The fifth embodiment as shown in FIG. 7 is the same as the first embodiment as shown in FIG. 1 except for the following points.

First, the fifth embodiment is provided with an equalizing processor 43A in place of the equalizing processor 43 in FIG. 1. The equalizing processor 43A differs from the equalizing processor 43 in its configuration, and is supplied with the estimated delay amount EDelay from the delay amount estimating section 45. Second, a channel estimating unit 44C is placed instead of the channel estimating unit 44A. The channel estimating unit 44C differs from the channel estimating unit 44A in its configuration.

The equalizing processor 43A carries out, when the estimated delay amount EDelay is smaller than a predetermined threshold, the equalization by using values obtained by clearing the delayed wave term of the estimated impulse response sequence {Eht} of the channel 20 estimated by the channel estimating unit 44C. The channel estimating section 44C obtains the estimated impulse response sequence {Eht} of the channel 20 from the sampled sequence $\{Y_n\}$ and the estimated transmitted symbol sequence $\{Ex_n\}$. The remaining portions are the same as those of FIG. 1.

The operation of the fifth embodiment will now be described. In this embodiment, the equalizing processor 43A employs the MLSE (Maximum Likelihood Sequence Estimation). The delay amount estimating section 45, receiving the sampled sequence {$y_n$} from the buffer 42, estimates the estimated delay amount EDelay (in terms of one symbol period T) over the channel 20, and outputs it to the equalizing processor 43A. The channel estimating section 44C obtains the estimated impulse response sequence {Eht} of the channel 20 from the sampled sequence {$y_n$} and the estimated transmitted symbol sequence {$Ex_n$}.

The equalizing processor 43A carries out the maximum likelihood sequence estimation (MLSE) based on the sampled sequence {$y_n$}, estimated impulse response sequence {Eht} and estimated delay amount EDelay to obtain the estimated transmitted symbol sequence {$Ex_n$}.

More specifically, the estimated transmitted symbol sequence {$Ex_n$} can be obtained by calculating the symbol sequence {$x_1, x_2, \ldots, x_n$} that maximizes the following expression (6) when the estimated delay amount EDelay is smaller than a switching threshold value θ; that is, when no delayed wave is present.

$$-\sum_{k=1}^{N} |y_k - x_0 Eh(t)|^2 \qquad (6)$$

When the estimated delay amount EDelay is greater than the switching threshold θ, the estimated transmitted symbol sequence {$Ex_n$} can be obtained by calculating the symbol sequence {$x_1, x_2, \ldots, x_n$} that maximizes the following expression (7).

$$-\sum_{k=1}^{N} \left| y_k - \sum_j x_j h(t - jT) \right|^2 \qquad (7)$$

Equations (6) and (7) can be operated effectively by the Viterbi algorithm.

As shown by the expression (6), the delay term taps of the channel estimation section are forced to be reset, when the estimated delay amount EDelay is smaller than the switching threshold θ, that is, when the delayed wave is absent.

According to the fifth embodiment, the adaptive equalizer is provided with the delay amount estimating section 45 for estimating the estimated delay amount EDelay of the received signal y(t). The delay term taps of the channel estimating section 44C are thus forced to be reset, when the estimated delay amount EDelay is smaller than the switching threshold θ, namely, when no delayed wave is present. This makes it possible to improve the demodulation characteristics of the receiver when the delayed wave is absent.

Although the foregoing embodiments are explained in connection with the adaptive equalizer applied to the receiver for mobile communications, the present invention can also be applied to an adaptive equalizer for use in data communications or the like in a fixed network.

The entire disclosure of Japanese patent application No. 106964/1996 filed on Apr. 26, 1996 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An adaptive equalizer comprising:

sampling means for sampling a received sequence of symbols transmitted over a transmission channel to produce a sequence of samples;

equalizer means for estimating transmitted symbols in response to the sequence of samples and an estimated impulse response of the transmission channel to generate an estimated sequence of transmitted symbols;

error extracting means for extracting an estimated error sequence from the sequence of samples and the estimated sequence of transmitted symbols;

tap coefficient update means for sequentially updating tap coefficients for said adaptive equalizer from the estimated error sequence and a step-size parameter to sequentially generate the estimated impulse response;

delay estimating means for estimating a delay amount of the received sequence of symbols according to the sequence of samples; and step-size controls for controlling either one of the step-size parameter and a leakage amount of past tap coefficients in response to the estimated delay amount.

2. An adaptive equalizer for compensating time-varying characteristics of a transmission channel by estimating an impulse response of the channel and by controlling tap coefficients of said adaptive equalizer in response to the estimated impulse response, said adaptive equalizer comprising:

a sampling circuit for sampling a received sequence of symbols provided over the channel, and for temporarily holding a sequence of samples;

an equalizer for estimating transmitted symbols in response to the sequence of samples and the estimated impulse response of the channel to generate an estimated sequence of transmitted symbols;

an error extracting circuit for extracting an estimated error sequence from the sequence of samples and the estimated sequence of transmitted symbols;

a tap coefficient update circuit for sequentially updating the tap coefficients from the estimated error sequence and a step-size parameter to sequentially generate the estimated impulse response of the channel;

a detecting circuit for obtaining from the sequence of samples either one of an estimated delay amount of the received sequence of symbols and an average amplitude of the received sequence of symbols to generate a value; and a control circuit for controlling either one of the step-size parameter and a leakage amount of past tap coefficients in response to the value from said detecting circuit when updating the tap coefficients.

3. The adaptive equalizer in accordance with claim 2, wherein said detecting circuit obtains the estimated delay amount of the received sequence of symbols, and said control circuit makes the step-size parameter proportional to the estimated delay amount of the received sequence of symbols.

4. The adaptive equalizer in accordance with claim 2, wherein said detecting circuit obtains the estimated delay amount of the received sequence of symbols, and said control circuit makes the leakage amount of the past tap coefficients proportional to the estimated delay amount of the received sequence of symbols.

5. The adaptive equalizer in accordance with claim 2, wherein said detecting circuit obtains the average amplitude of the received sequence of symbols, and said control circuit makes the step-size parameter proportional to the average amplitude of the received sequence of symbols.

6. The adaptive equalizer in accordance with claim 2, wherein said detecting circuit obtains the average amplitude of the received sequence of symbols, and said control circuit makes the leakage amount of the past tap coefficients proportional to the average amplitude of the received sequence of symbols.

7. The adaptive equalizer in accordance with claim 2, wherein said tap coefficient update circuit sequentially updates the tap coefficients from the estimated error sequence and a step-size parameter by using least mean square algorithm.

8. An adaptive equalizer comprising:

sampling means for sampling a received sequence of symbols to produce a sequence of samples;

equalizer means for estimating transmitted symbols in response to the sequence of samples and an estimated impulse response of a transmission channel to generate an estimated sequence of transmitted symbols;

channel estimating means for estimating an impulse response of the transmission channel in response to the sequence of samples and the estimated sequence of transmitted symbols to generate the estimated impulse response; and delay estimating means for estimating a delay amount of the received sequence of symbols according to the sequence of samples;

wherein said equalizer means carries out, when the delay amount of the received sequence of symbols is smaller than a predetermined threshold equalization, processing by using values to reset a delayed wave term of the estimated impulse response of the channel estimated by said channel estimating means.

9. An adaptive equalizer for compensating time-varying characteristics of a transmission channel by estimating an impulse response of the channel and by controlling tap coefficients of said adaptive equalizer in response to an estimated impulse response, said adaptive equalizer comprising:

a sample-and-hold circuit for sampling a received sequence of symbols provided over said channel, and for temporarily holding a sequence of samples;

an equalizer circuit for estimating transmitted symbols in response to the sequence of samples and the estimated impulse response of the channel to generate an estimated sequence of transmitted symbols;

a channel estimating circuit for estimating the impulse response of the channel in response to the sequence of samples and the estimated sequence of transmitted symbols; and a delay amount estimating circuit for estimating an estimated delay amount of the received sequence of symbols from the sequence of samples;

wherein said equalizer circuit carries out, when the delay amount of the received sequence of symbols is smaller than a predetermined threshold, equalization processing by using values to reset a delayed wave term [is reset] of the estimated impulse response of the channel estimated by said channel estimating circuit.

10. An adaptive equalizer comprising:

a sampling circuit for sampling a received sequence of symbols transmitted over a transmission channel to produce a sequence of samples;

an equalizer for estimating transmitted symbols in response to the sequence of samples and an estimated impulse response of the transmission channel to generate an estimated sequence of transmitted symbols;

an error extracting circuit for extracting an estimated error sequence from the sequence of samples and the estimated sequence of transmitted symbols;

a tap coefficient update circuit for sequentially updating tap coefficients for said adaptive equalizer from the estimated error sequence and a step-size parameter to sequentially generate the estimated impulse response;

a delay estimating circuit for estimating a delay amount of the received sequence of symbols according to the sequence of samples; and a control circuit for controlling either one of the step-size parameter and a leakage amount of past tap coefficients in response to the estimated delay amount.

* * * * *